United States Patent Office 3,682,616
Patented Aug. 8, 1972

3,682,616
HERBICIDAL COMPOSITION
Ichiro Kimura, Ogasa-gun, Hironari Sugiyama, Shimizu, and Masaru Kado, Yokohama, Japan, assignors to Kumiai Chemical Industry Co., Ltd., Tokyo, Japan
No Drawing. Filed Aug. 18, 1969, Ser. No. 851,059
Claims priority, application Japan, Aug. 28, 1968, 43/61,188; Jan. 7, 1969, 44/1,176
Int. Cl. A01n 9/12
U.S. Cl. 71—93
9 Claims

ABSTRACT OF THE DISCLOSURE

The herbicidal composition comprises a herbicidally effective amount of a mixture of S-benzyl-alkylthiocarbamate having the general formula

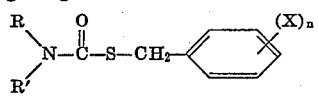

wherein R and R' are hydrogen or a lower alkyl, X is halogen or methyl group and $n$ is a whole number of from 0 to 2, and 2-methylthio-4,6-bis-alkylamino-S-triazine.

---

The present invention relates to a herbicidal composition having a long good active period for treatment characterized by comprising a mixture of S-(benzyl, halogenated benzyl, or methylated benzyl)-mono-, or di-alkylthiocarbamate having the general formula:

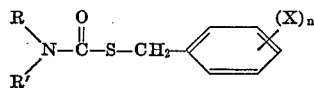

wherein R, R' are selected from the group consisting of hydrogen and a lower alkyl, X is selected from the group consisting of halogen and methyl and $n$ is a whole number of from 0 to 2, and 2-methylthio-4,6-bis-alkylamino-S-triazine as an effective ingredient, and a process for preparing such herbicidal composition and a method of using such composition.

Many weeds in a paddy field for rice plants grow over the period of about two weeks after planting and it is difficult to select the proper time of treatment accurately. By the way, the commercially available PCP, MO (4-nitro-2',4',6'-trichlorodiphenyl ether), etc., are effective in the early stage of weed germination but are significantly poor in effectiveness in the growing stage. Therefore, ten days after planting the rice plant, it is impossible to accomplish the herbicidal purpose. For example, even if the herbicidal effect is once attained by the early treatment, it is impossible to control the weeds germinated ten days after planting. Considering these examples, the most effective and ideal time of removing the weeds in the paddy field, i.e., the best time of treating with the herbicide seems to be the time when the weeds have grown completely and uniformly. However, any conventional herbicides do not satisfy the above requirement.

However, because of a shortage of labor in a farm village and for the purpose of reasonable distribution of labor in the planting season, the development of a herbicide capable of removing by one treatment all weeds germinating and growing in all seasons has been requested.

2 - methylthio - 4,6 - bis - ethylamino - S - triazine (hereinafter being referred to cymetrine) which is one component of the present invention is an absorbing and passing type of herbicide, like other triazine herbicides, which kills the weeds or inhibits the germination thereof by hindering the photosynthesis, and is often injurious to a leaf of paddy field rice plant when used in the season of high temperature. In spite of having such defect, cymetrine is known to be effective for the weeds having started to germinate. However, this effect is from the time immediately after planting up to 7 to 10 days and is not sufficient in case the growth of weeds has proceeded to 15 to 20 days.

As the result of researching on a cooperating agent for the purpose of obtaining a positive herbicidal effect when using at any time during the period from the time immediately after planting to 20 days, the present inventors have found that an excellent herbicide can be obtained by mixing cymetrine with the following compound:

S-(4-chlorobenzyl) - N,N - diethylthiocarbamate (hereinafter being referred to CBDC) B.P. 127–131° C./0.12 mm. Hg S-(2,4 - dichlorobenzyl) - N,N - diisopropylthiocarbamate (hereinafter being referred to DCDC) B.P. 142–144° C./0.02 mm. Hg S-(4 - methylbenzyl) - N,N - diethylthiocarbamate (hereinafter being referred to MBDC) B.P. 107–175° C./0.002 mm. Hg S-(2 - chlorobenzyl) - N - ethylthiocarbamate (hereinafter being referred to CBMC) B.P. 143–147° C./0.03 mm. Hg S-(2-bromobenzyl) - N,N - diisopropylthiocarbate B.P. 152–156° C./0.04 mm. Hg S-(2-methylbenzyl) - N,N - di - n - butylthiocarbamate B.P. 108–112° C./0.005 mm. Hg S - (2 - chlorobenzyl) - N,N - diisopropylthiocarbamate B.P. 142–146° C./0.04–0.05 mm. Hg S-(3,4-dichlorobenzyl)-N,N - di - n - propylthiocarbamate B.P. 167–170° C./0.007 mm. Hg S - (3,4 - dichlorobenyl) - N,N - dimethylthiocarbamate B.P. 150–165° C./0.02 mm. Hg S - (4 - bromobenzyl) - N,N - diethylthiocarbamate M.P. 37–38° C.

S - (4 - bromobenzyl) - N,N - di - n - propylthiocarmabate B.P. 159–161° C./0.05 mm. Hg S - (4 - bromobenzyl) - N,N - diisopropylthiocarbamate B.P. 150–152° C./0.05 mm. Hg S - (4 - iodobenzyl) - N,N - diethylthiocarbamate M.P. 58–59° C.

S - (4-iodobenzyl) - N,N-di-isopropylthiocarbamate M.P. 67–68° C.

S - (2,5 - dimethylbenzyl) - N,N-di-n-propylthiocarbamate B.P. 146° C./0.1 mm. Hg S - (3,4 - dimethylbenzyl)-N,N-di-n-propylthiocarbamate B.P. 137–141° C./0.005 mm. Hg S - (2,5 - dichlorobenzyl) - N,N - dimethylthiocarbamate B.P. 148–150° C./0.06 mm. Hg These S-(benzyl, halogenated benzyl, or methylated benzyl)-mono-, or di-alkylthiocarbamates themselves have a herbicidal action which is, however, effective up to only 7 to 10 days after planting, and it has been found that cymetrine is effective in 20 days after planting by mixing CBDC, etc., in particular not only remarkably effective for a 2 to 3 leaf stage-barnyard grass which has hitherto been difficult to remove but also completely kill slender spikerush which has hitherto been difficult to remove with cymetrine only. This is true for an annual rice weed and a broad leaf weed.

And the complete weeding which has hitherto been impossible has now become possible by the herbicidal composition of the present invention.

The mechanism of the effectiveness of the present herbicidal composition for the weeds, in particular slender spikerush in the growing stage has not yet been understood sufficiently, however, it is considered to consist in that the absorption of cymetrine in the stem and leaf of weed is increased by mixing a CBDC therewith and the accumulation of cymetrine a photosynthesis inhibitor, in the tissue is increased by the action of CBDC, etc., preventing the growth of weed.

In the herbicidal composition of the present invention any phytotoxicity is not recognized at all for the paddy field rice plant because of reducing the amount of cymetrine and adding a small amount of CBDC, etc., in spite of being remarkable in weeding effect.

That the herbicidal composition of the invention can be used in the late period after planting rice plant is not only desirable for the distribution of labor, but also is advantageous in that:

(1) there is no fear of phytotoxicity due to the advance of setting of paddy field rice plant;
(2) the period of controlling the weed is extended; and
(3) the falling down and flowing out of herbicidal composition is prevented by decrease of water leakage.

Additionally, the advantage of the present invention consists in that the herbicide to be employed is satisfactory in a small amount. By synergistic herbicidal effect, the herbicidal composition of the present invention is prepared by mixing 1 part of CBDC, etc., and 0.05 to 1.5 part of cymetrine which are effective ingredients. The amount of each ingredient to be mixed can be, of course, more reduced than in the case each ingredient is used alone. However, the most desirable range is 0.1 to 1.0 part, by weight, of cymetrine per 10 parts of CBDC, etc.

Most effectively, the heribicidal composition of the present invention may be prepared in granular form. That is, the present composition may be used in the granular form by scattering it by hand, or by means of a scattering means or helicopter, etc., which has been prepared by increasing the quantity with bentonite, clay, talc, lime stone, etc., adding a bonding agent, such as sodium alkylbenzene sulfonate, polyvinylalcohol (PVA), sodium lignin sulfonate, etc., thereto, kneading the mixture together with water and extruding, granulating and drying, or by dissolving the composition in a suitable solvent, such as dimethylformamide (DMF), and adsorbing uniformly the solution in granulated diatomaceous earth, etc.

However, if necessary, the herbicidal composition of the present invention may be used by preparing a wettable powder, emulsion or dust containing the composition and sprinkling it, after diluting with water, or directly. And also, if necessary, insecticides, other pesticides, or herbicides, etc., may be mixed therewith and prepared.

The present invention will be further illustrated with the following examples in which the percentage is shown by weight:

EXAMPLE 1

Preparation of granules

7% of CBDC, 1.5% of cymetrine, 2% of sodium lignin sulfonate, 5% of white carbon and 84.5% of bentonite were crushed and mixed homogeneously and, after adding a suitable amount of water, were kneaded, and were granulated by means of an extrusion type of granulator, and then were dried and meshed to obtain granules having 14 to 32 meshes.

EXAMPLE 2

Preparation of granules

5% of CBDC, 1% of cymetrine, 48% of bentonite, 44.5% of clay, 1% of sodium alkylbenzenesulfonate, and 0.5% of PVA were crushed and mixed homogeneously, and, after adding a suitable amount of water, were treated as in Example 1 to obtain granules.

EXAMPLE 3

Preparation of granules

3% of CBDC, 1.5% of cymetrine, 40% of calcium bicarbonate, 52.5% of clay, 1% of sodium alkylbenzenesulfonate, and 2% of sodium lignin sulfonate were crushed and mixed homogeneously and were treated as in Example 1 to obtain granules.

EXAMPLE 4

Preparation of granules

10% of CBDC, 1% of cymetrine, 40% of calcium bicarbonate, 45.5% of clay, 1.5% of sodium alkylbenzenesulfonate, and 2% of sodium lignin sulfonate were crushed and mixed homogeneously and were granulated as in Example 1.

EXAMPLE 5

Preparation of granules

4% of CBDC, 2.5% of cymetrine, 41.5% of clay, 1.5% of calcium alkylbenzenesulfonate, 50% of bentonite, and 0.5% of PVA were crushed and mixed homogeneously and were granulated as in Example 1.

EXAMPLE 6

Preparation of granules 1.5% of CBDC, 1.5% of cymetrine, 50% of bentonite, 45.5% of clay, 1% of sodium alkylbenzenesulfonate and 0.5% of PVA were crushed and mixed homogeneously, and after adding a suitable amount of water, were kneaded, and were granulated by means of an extrusion type of granulator, and then were dried and meshed to obtain granules having 14 to 32 meshes.

EXAMPLE 7

Preparation of granules

5% of the solution of cymetrine dissolved in five times amount of DMF and 5% of CBDC were absorbed in 90% of granulated diatomaceous earth of 8 to 32 meshes to obtain granules.

EXAMPLE 8

Preparation of dusts

5% of MBDC, 1% of cymetrine and 94% of diatomaceous earth were crushed and mixed homogeneously, and then were used as a dust.

EXAMPLE 9

Preparation of wettable powder

15% of DCDC, 15% of cymetrine, 2% of Emarl #40 (trademark of Kao Atlas Co., Ltd.), 2% of Demol (trademark of Kao Atlas Co., Ltd.), 10% of white carbon and 56% of diatomaceous earth were mixed and crushed, and were diluted with water to obtain a wettable powder.

EXAMPLE 10

Preparation of emulsion

20% of CBDC, 5% of cymetrine, 15% of Sorbal (trademark of Toho Chemical Industry Co., Ltd.), and 60% of xylol were mixed and dissolved, and then were diluted with water to obtain an emulsion.

The effect of the present herbicidal composition will be further illustrated with the following experimental examples.

EXPERIMENTAL EXAMPLE 1

Test for synergistic herbicidal effect of the the mixture on weeds in the early germination.

A slender spikerush at the germination time, a barnyard grass at the germination time, a barnyard grass at the 1-leaf stage, a barnyard grass at the 2-leaf stage, and a paddy field rice plant at the 3-leaf stage were planted separately in a pot having a diameter of 150 cm. After submerging to the depth of 3 cm., cymetrine, CBDC, MBDC, DCDC or CBMC single agent and mixture of cymetrine and CBDC, MBDC, DCDC or CBMC which were prepared to granules, were scattered by hand thereon. On 15th date after the treatment, the numbers and weights of weeds grown and the phytotoxicity for paddy field rice plant were investigated and the results are as in Table 1.

TABLE 1

| Sample agent | Amount kg./10 y. | Slender spikerush, number each | Barnyard grass (g.) Treatment at the germination time | Treatment at the 1-leaf stage | Treatment at the 2-leaf stage | Phytotoxicity for paddy field rice plant |
|---|---|---|---|---|---|---|
| Cymetrine 1.5% | 0.75 | 59 | 1.5 | 1.7 | 6.0 | None. |
| Do | 1 | 44 | 0 | 1.6 | 6.0 | Do. |
| Do | 1.5 | 20 | 0 | 0.5 | 4.0 | Do. |
| Do | 2.0 | 5 | 0 | 0.3 | 4.0 | Do. |
| CBDC 7% | 0.75 | 13 | 0.2 | 2.0 | 5.8 | Do. |
| Do | 1 | 10 | 0 | 1.2 | 4.5 | Do. |
| Do | 1.5 | 3 | 0 | 0.5 | 4.3 | Do. |
| Do | 2.0 | 0 | 0 | 0.5 | 4.0 | Do. |
| MBDC 7% | 0.75 | 15 | 0.6 | 2.0 | 5.9 | Do. |
| Do | 1 | 13 | 0 | 1.4 | 4.8 | Do. |
| Do | 1.5 | 8 | 0 | 0.9 | 4.5 | Do. |
| Do | 2.0 | 0 | 0 | 0.6 | 4.0 | Do. |
| DCDC 7% | 0.75 | 18 | 0.4 | 2.0 | 5.9 | Do. |
| Do | 1 | 16 | 0 | 1.6 | 4.7 | Do. |
| Do | 1.5 | 8 | 0 | 1.0 | 4.4 | Do. |
| Do | 2.0 | 0 | 0 | 0.5 | 4.0 | Do. |
| CBMC 7% | 0.75 | 16 | 0.6 | 2.0 | 5.9 | Do. |
| Do | 1 | 12 | 0.1 | 1.8 | 4.8 | Do. |
| Do | 1.5 | 6 | 0 | 0.5 | 4.6 | Do. |
| Do | 2.0 | 0 | 0 | 0.5 | 4.0 | Do. |
| Cymetrine 1.5% + CBDC 7% | 0.5 | 0 | 0 | 1.0 | 3.5 | Do. |
| Do | 0.75 | 0 | 0 | 0.6 | 2.0 | Do. |
| Do | 1 | 0 | 0 | 0 | 0.4 | Do. |
| Do | 1.5 | 0 | 0 | 0 | 0 | Do. |
| Do | 2.0 | 0 | 0 | 0 | 0 | Do. |
| Cymetrine 1.5% + MBDC 7% | 0.5 | 0 | 0 | 1.3 | 3.5 | Do. |
| Do | 0.75 | 0 | 0 | 0.8 | 2.5 | Do. |
| Do | 1 | 0 | 0 | 0.4 | 1.5 | Do. |
| Do | 1.5 | 0 | 0 | 0 | 0.2 | Do. |
| Do | 2.0 | 0 | 0 | 0 | 0 | Do. |
| Cymetrine 1.5% + DCDC 7% | 0.5 | 0 | 0 | 1.2 | 3.5 | Do. |
| Do | 0.75 | 0 | 0 | 0.7 | 2.5 | Do. |
| Do | 1 | 0 | 0 | 0 | 0.3 | Do. |
| Do | 1.5 | 0 | 0 | 0 | 0 | Do. |
| Do | 2.0 | 0 | 0 | 0 | 0 | Do. |
| Cymetrine 1.5% + CBMC 7% | 0.5 | 0 | 0 | 1.2 | 3.5 | Do. |
| Do | 0.75 | 0 | 0 | 0.7 | 2.5 | Do. |
| Do | 1 | 0 | 0 | 0 | 0.4 | Do. |
| Do | 1.5 | 0 | 0 | 0 | 0 | Do. |
| Do | 2.0 | 0 | 0 | 0 | 0 | Do. |
| Non-treatment | | 63 | 1.9 | 2.0 | 8.4 | Do. |

EXPERIMENTAL EXAMPLE 2

Test for synergistic herbicidal effect of the mixture on weeds in the early growth.

Paddy field soil containing a large number of slender spikerush roots was filled up in a pot having a diameter of 12 cm. and 35 grains of barnyard grass seed were sowed therein. When the barnyard grass grew to a 3-leaf stage after two weeks, water was sprinkled to the depth of 3 cm. and the agent to be tested was dispersed. On 15th date after the dispersion, the degree of inhibiting a slender spikerush and barnyard grass was investigated. The results are shown in Table 2.

EXPERIMENTAL EXAMPLE 3

Herbicidal test by periodical treatment after sowing barnyard grass seeds.

Paddy field soil containing slender spikerush roots was fielded up in a 800 cm.$^3$ pot and 50 barynard grass seeds were sowed thereon.

Immediately after sowing barnyard grass seeds, and on 5th date, 10th date and 15th date after sowing the seeds, the agent to be tested was dispersed and two weeks after the dispersion the investigations were made. The present composition tested as a sample was a granule containing 5% of CBDC and 1% of cymetrine and the controls were a granule containing 10% CBDC, and a granule containing 1.5% of cymetrine.

TABLE 2

| Sample agent | Amount, g./10 a. CBDC | Cymetrine | Barnyard grass, number | Broad leaf weed, number | Slender spikerush killed [1] |
|---|---|---|---|---|---|
| Example 2 | 150 | 30 | 0 | 0 | 5 |
| Do | 100 | 20 | 0 | 2 | 4.5 |
| Do | 50 | 10 | 3 | 4 | 3.5 |
| Example 3 | 100 | 50 | 0 | 0 | 5 |
| Do | 50 | 25 | 0 | 3 | 4.5 |
| Do | 25 | 12.5 | 6 | 4 | 3 |
| Comparison (CBDC) [2] | 500 | | 4 | 8 | 3.5 |
| Do | 250 | | 11 | 11 | 2 |
| Do | 200 | | 20 | 15 | 1 |
| Comparison (cymetrine 1.5%) | | 100 | 20 | 2 | 2 |
| Do | | 50 | 8 | 8 | 1 |
| Do | | 25 | 18 | 17 | 0 |
| Nontreatment | | | 27 | 24 | 0 |

[1] Standard valuation of killing slender spikerush: 5=100% killed; 4=80% killed; 3=60% killed; 2=40% killed; 1=20% killed; 0=0% killed.
[2] Granule absorbed uniformly 10% of CBDC in granulated diatomaceous earth of 8 to 32 meshes.

The results are shown in Table 3.

TABLE 3

| Sample agent | Amount, kg./10 a. | Treatment immediately after sowing barnyard seeds [1] (each) | | Treatment 5 days after sowing barnyard seeds [2] (each) | | Treatment 10 days after sowing barnyard seeds [3] (each) | | Treatment 15 days after sowing barnyard seeds [4] (each) | |
|---|---|---|---|---|---|---|---|---|---|
| | | Barny | Slender spikerush | Barny | Slender spikerush | Barny | Slender spikerush | Barny | Slender spikerush |
| The present composition (Example 2) | 1 | 20 | 12 | 24 | 18 | 37 | 16 | 33 | 23 |
| Do | 2 | 4 | 6 | 7 | 5 | 8 | 4 | 13 | 12 |
| Do | 3 | 0 | 0 | 2 | 1 | 0 | 2 | 3 | 3 |
| CBDC | 1 | 46 | 86 | 47 | 77 | 47 | 81 | 47 | 81 |
| Do | 2 | 32 | 24 | 37 | 17 | 40 | 68 | 45 | 78 |
| Do | 3 | 12 | 7 | 16 | 9 | 27 | 41 | 38 | 57 |
| Cymetrine | 1 | 37 | 80 | 40 | 73 | 48 | 89 | 49 | 81 |
| Do | 2 | 11 | 56 | 19 | 68 | 38 | 75 | 47 | 78 |
| Do | 3 | 0 | 18 | 2 | 41 | 17 | 53 | 41 | 76 |
| Non-treatment | | 48 | 86 | 52 | 78 | 51 | 93 | 48 | 93 |

[1] Barnyard height, 0 cm., slender spikerush height, 0 cm.
[2] Barnyard height, 2 cm., slender spikerush height, 0.3 cm.
[3] Barnyard height, 5 cm., slender spikerush height, 1.2 cm.
[4] Barnyard height, 8 cm., slender spikerush height, 2.3 cm.

In case of using each CBDC and cymetrine alone, its weeding effect is remarkably poor as the growth of weed proceeds, while the present herbicidal composition can kill weeds regardless the stages of weed.

EXPERIMENTAL EXAMPLE 4

Test for herbicidal effect on 20 days after planting rice plants.

On 20th date after planting rice plants, a paddy field was divided to 10 m.² per section of granules comprising the mixture of CBDC and cymetrine were applied thereto by 2 kg. or 4 kg. per 10 a. 30 days after treatment the amount of weeds grown on the area of 1 m.² in the test section and the phytotoxicity of agent for paddy field rice plant were investigated. The test results were shown in Table 4.

TABLE 4

| Sample agent | Amount of agent, kg./10 a. | Number of weeds grown | | | Slender spikerush net weight, gram | Phytotoxicity for water field rice plants |
|---|---|---|---|---|---|---|
| | | Barnyard grass | Jointed flat edge grass | Konagi grass | | |
| CBDC 7% plus cymetrine 15% | 2 | 0 | 0 | 0 | 0 | — |
| Do | 4 | 0 | 0 | 0 | 0 | — |
| CBDC 10% plus cymetrine 1% | 2 | 0 | 1 | 0 | 0 | — |
| Do | 4 | 0 | 0 | 0 | 0 | — |
| CBDC 4% plus cymetrine 2.5% | 2 | 0 | 0 | 1 | 2 | — |
| Do | 4 | 0 | 0 | 0 | 0 | — |
| MO granule 7% | 2 | 21 | 37 | 12 | 650 | — |
| Do | 4 | 11 | 15 | 5 | 385 | ± |
| NIP granule 7% | 2 | 22 | 48 | 16 | 720 | — |
| Do | 4 | 14 | 22 | 11 | 415 | ± |
| Non-treatment | | 28 | 62 | 21 | 935 | — |

NOTE.—MO granule and NIP granule are the controls commercially available.

As being apparent from the above results, the herbicidal composition of the present invention is high in weeding effect even when the weeds have been grown on 20 days after planting rice plants and is clearly more effective in comparison with NIP and MO commonly now employed by farmers. The present composition has such advantages that the period suitable for its use is long and that the spraying thereof from the flying machine is practicable.

What is claimed is:

1. A herbicidal composition containing as an active ingredient a herbicidally effective amount of the mixture of S-(benzyl, halogenated benzyl, or methylated benzyl)-mono-, or di-alkylthiocarbamate having the general formula:

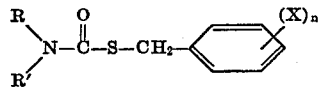

wherein R, R' are selected from the group consisting of hydrogen and a lower alkyl, X is selected from the group consisting of halogen and methyl and $n$ is a whole number of from 0 to 2, and 2-methylthio-4,6-bis-alkylamino-S-triazine.

2. A herbicidal composition containing as an active ingredient a herbicidally effective amount of the mixture of S-(4-chlorobenzyl) N,N - diethylthiocarbamate and 2-methylthio-4,6-bis-ethylamino-S-triazine.

3. A herbicidal composition containing as an active ingredient a herbicidally effective amount of the mixture of S-(4-methylbenzyl) N,N - diethylthiocarbamate and 2-methylthio-4,6-bis-ethylamino-S-triazine.

4. A herbicidal composition as set forth in claim 1, wherein halogen in the active ingredient is chlorine or bromine.

5. A herbicidal composition as set forth in claim 1, wherein alkyl in S-(benzyl, halogenated or methylated benzyl)-mono-, or di-alkylthiocarbamate is methyl, ethyl, propyl or butyl.

6. A herbicidal composition as set forth in claim 1, wherein the compounding ratio of thiocarbamate compound and triazine compound is 1:0.05 to 1.5 by weight.

7. A herbicidal composition as set forth in claim 1, wherein it is in the form of granule containing a thiocarbamate compound and a triazine compound.

8. A method for killing weeds comprising applying to the locus to be treated a herbicidally effective amount of a herbicidal composition containing as an active ingredient S-(benzyl, halogenated benzyl, or methylated benzyl)-mono-, or di-alkylthiocarbamate having the general formula:

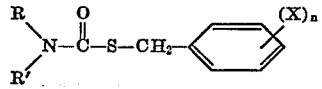

wherein R, R' are selected from the group consisting of hydrogen and a lower alkyl, X is selected from the group consisting of halogen and $n$ is a whole number of from 0 to 2, and 2-methylthio-4,5-bis-alkylamino-S-triazine.

9. A method of killing undesirable weeds in the paddy field, comprising scattering a herbicidal composition as set forth in claim 1 on the paddy field soil for rice plant.

References Cited

FOREIGN PATENTS

| 995,497 | 6/1965 | Great Britain | 71—100 |
| 4,022,757 | 7/1965 | Japan | 71—93 |
| 4,121,799 | 12/1966 | Japan | 71—93 |

JAMES O. THOMAS, Jr., Primary Examiner

U.S. Cl. XR.

71—100